(12) United States Patent
Muhammad et al.

(10) Patent No.: US 11,606,116 B2
(45) Date of Patent: Mar. 14, 2023

(54) HYBRID SELF-INTERFERENCE CANCELATION IN FREQUENCY DIVISION DUPLEXING SYSTEM

(71) Applicant: Samsung Electronics Co., Ltd., Suwon-si (KR)

(72) Inventors: Khurram Muhammad, Southlake, TX (US); Jin Yuan, Richardson, TX (US); Xinguang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 17/383,295

(22) Filed: Jul. 22, 2021

(65) Prior Publication Data

US 2022/0038133 A1  Feb. 3, 2022

Related U.S. Application Data

(60) Provisional application No. 63/059,094, filed on Jul. 30, 2020.

(51) Int. Cl.
*H04B 1/525* (2015.01)

(52) U.S. Cl.
CPC .................................. *H04B 1/525* (2013.01)

(58) Field of Classification Search
CPC .................................................... H04B 1/525
See application file for complete search history.

(56) References Cited

U.S. PATENT DOCUMENTS 10,236,922 B2  3/2019 Choi et al.
10,425,115 B2  9/2019 Hahn et al.
10,663,541 B2  5/2020 Babakhani et al.
10,797,745 B2  10/2020 Kim et al.
10,924,257 B2  2/2021 Jung et al.
2016/0323830 A1  11/2016 Kim et al.
(Continued)

FOREIGN PATENT DOCUMENTS

CN  111277300 A  6/2020
EP  3496283 A1  6/2019
(Continued)

OTHER PUBLICATIONS

International Search Report dated Oct. 27, 2021 in connection with International Patent Application No. PCT/KR2021/009896, 4 pages.

(Continued)

*Primary Examiner* — Natasha W Cosme

(57) ABSTRACT

A communication device includes an antenna configured to receive a signal in a receive band and transmit a signal in a transmit band through a duplexer, analog transmitter-side radio frequency (RF) self-interference cancelation (SIC) circuitry configured to reduce power of the transmit signal in the receive band before input to the antenna, analog receiver-side RF SIC circuitry configured to reduce power of the receive signal in the transmit band before input to a first analog-to-digital converter (ADC) to convert the receive signal from analog to digital, a coupler configured to couple a small part of the transmit signal to a second ADC to convert the transmit signal from analog to digital, and digital SIC circuitry configured to process the digital sample to generate and apply an SIC signal to the digital receive signal to cancel interference induced in the receive signal by the transmit signal.

20 Claims, 11 Drawing Sheets

(56) References Cited

U.S. PATENT DOCUMENTS

| | | |
|---|---|---|
| 2018/0026672 A1 | 1/2018 | Haine et al. |
| 2019/0245566 A1 | 8/2019 | Luo et al. |
| 2020/0252115 A1 | 8/2020 | Paramesh et al. |
| 2021/0006279 A1 | 1/2021 | Boos |
| 2021/0006282 A1 | 1/2021 | Faerber et al. |

FOREIGN PATENT DOCUMENTS

| | | |
|---|---|---|
| JP | 2018-509116 A | 3/2018 |
| KR | 10-2016-0102178 A | 8/2016 |
| KR | 102388537 B1 | 4/2022 |

OTHER PUBLICATIONS

Written Opinion of the International Searching Authority dated Oct. 27, 2021 in connection with International Patent Application No. PCT/KR2021/009896, 4 pages.

HYBRID SELF-INTERFERENCE CANCELATION IN FREQUENCY DIVISION DUPLEXING SYSTEM

CROSS-REFERENCE TO RELATED APPLICATION AND CLAIM OF PRIORITY

This application claims priority under 35 U.S.C. § 119(e) to U.S. Provisional Patent Application No. 63/059,094 filed on Jul. 30, 2020. The above-identified provisional patent application is hereby incorporated by reference in its entirety.

TECHNICAL FIELD

This disclosure relates generally to self-interference cancelation in radio antenna systems. Embodiments of this disclosure relate to self-interference cancelation to relieve isolation requirements of a duplexer in frequency division duplexing (FDD) systems.

BACKGROUND

In many parts of the world, significant portions of expansion in mobile wireless network capacity are due to expansions in the geographic coverage of wireless data networks. Technically and economically, this presents a set of challenges for keeping, as well as expanding, coverage in LTE and 5G cellular communication systems. Most of the LTE and 5G bands are at high frequencies, which have higher path loss and wider bandwidth than low frequency bands, and which have lower power spectrum density (PSD). Therefore, cell edge users typically have to be allocated with less than the full bandwidth of the available spectrum in order to boost the signal-to-noise ratio (SNR) at the base station (BS) for better reception.

Most of the frequency bands are allocated as frequency division duplex (FDD) bands, in which two separate frequency bands, or channels, are assigned for simultaneous (i.e., full duplex) downlink (DL) and uplink (UL) communications. Although FDD has the benefits of greater coverage due to accommodating higher transmission power, higher frequency resource efficiency with no guard time allocated, and potentially lower latency due to continuous transmission and reception, a sufficient guard band needs to separate the transmitting and receiving channels, so they do not interfere with one another and guarantee clear and uninterrupted transmission. Even though a large frequency separation band is assigned between the UL and DL bands, extremely high isolation (typically more than 80 dB) is required between the UL and DL signal paths in FDD wireless communication devices to mitigate the interference between UL and DL bands.

SUMMARY

Embodiments of the present disclosure provide a method and an apparatus for self-interference cancelation in a communication device. In one embodiment, a communication device comprises an antenna configured to receive a receive signal in a receive frequency band and transmit a transmit signal in a transmit frequency band, a duplexer operably connected to the antenna, transmit path circuitry configured to generate the transmit signal for input to the duplexer, analog transmitter-side radio frequency (RF) self-interference cancelation circuitry configured to reduce leakage power from the transmit signal to the receive frequency band before input to the antenna, and analog receiver-side RF self-interference cancelation circuitry configured to reduce power of the receive signal in the transmit frequency band, then the overall receive power, before input to receive path circuitry. The receive path circuitry is configured to process the receive signal, and includes a first analog to digital converter (ADC) configured to convert the receive signal from an analog receive signal to a digital receive signal. The communication device further comprises coupled path circuitry comprising a coupler and a second ADC, the coupler configured to couple a small part of the transmit signal to the second ADC, and the second ADC configured to convert the coupled transmit signal from an analog signal to digital samples of the coupled transmit signal. The communication device further comprises digital self-interference cancelation circuitry configured to process the digital sample of the transmit signal that is output by the coupled path circuitry to generate a self-interference cancelation signal, and apply the self-interference cancelation signal to the digital receive signal that is output by the first ADC to cancel interference induced in the receive signal by the transmit signal.

In another embodiment, a communication device comprises an antenna configured to receive a receive signal in a receive frequency band and transmit a transmit signal in a transmit frequency band, and a duplexer operably connected to the antenna and configured to reduce interference induced in the receive signal by the transmit signal. The duplexer comprises a receiver-side filter and a transmitter-side filter. The communication device further comprises transmit path circuitry configured to generate the transmit signal for input to the duplexer, analog transmitter-side radio frequency (RF) self-interference cancelation circuitry configured to reduce leakage power from the transmit signal to the receive frequency band before input to the antenna, receive path circuitry configured to receive the receive signal from the duplexer and to process the receive signal, and analog receiver-side RF self-interference cancelation circuitry configured to reduce power of the receive signal in the transmit frequency band, then the overall receive power, before input to the receive path circuitry.

In one embodiment, a method for self-interference cancelation includes generating, by transmit path circuitry, a transmit signal to be input to a duplexer and transmitted through an antenna in a transmit frequency band, and receiving, via the antenna, a receive signal in a receive frequency band. The method further comprises reducing power of the transmit signal in the receive frequency band, by analog transmitter-side radio frequency (RF) self-interference cancelation circuitry, before input to the antenna, and reducing power of the receive signal in the transmit frequency band, by analog receiver-side RF self-interference cancelation circuitry, before input to receive path circuitry. The method further comprises converting, by a first analog to digital converter (ADC) in the receive path circuitry, the receive signal from an analog receive signal to a digital receive signal, converting, by a second ADC in a coupled path circuitry, a small part of the transmit signal from an analog signal to digital samples of the transmit signal, processing, by digital self-interference cancelation circuitry, the digital sample of the transmit signal to generate a self-interference cancelation signal, and applying, by the digital self-interference cancelation circuitry, the self-interference cancelation signal to the digital receive signal to cancel interference induced in the receive signal by the transmit signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present disclosure and its advantages, reference is now made to the following description taken in conjunction with the accompanying drawings, in which like reference numerals represent like parts.

DETAILED DESCRIPTION

Figure 1:
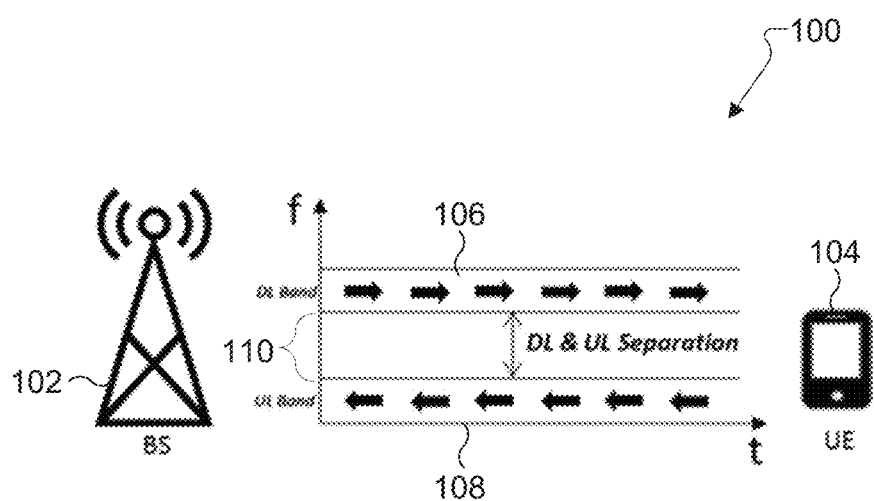
FIG. 1 illustrates an example wireless system, which transmits signals according to the principles of the present disclosure.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that even though a large separation band (typically tens or even hundreds of MHz) is assigned between the UL and DL bands in an FDD system, there are two challenges for a FDD duplexer. First, transmitter (TX) leakage into the receiver (RX), due to power amplifier (PA) non-linearity that causes adjacent channel leakage, and due to antenna coupling. If the TX leakage in the RX band cannot be reduced to lower than the input referred RX noise floor at the RX chain input, the TX leakage will degrade the receiver sensitivity, which decreases the coverage.

Second, the TX noise floor is also much higher than the RX noise floor due to the high noise figure of the digital-to-analog converter (DAC) in the TX chain and the high gain of the TX chain from DAC output to PA output. If the TX noise coupled to the RX chain input is not lower than the RX input referred noise floor, it will also degrade the UL receiver sensitivity, which further decreases the coverage. The input referred RX input noise floor will be referred to as the RX noise floor.

Embodiments of the present disclosure recognize that, to address the above issues, a duplexer with isolation is implemented in FDD wireless communication devices to isolate the UL and DL bands. The TX leakage and TX noise floor can be decreased to lower than the RX noise floor by the high isolation in the duplexer, the UL receiver's sensitivity is thereby guaranteed, and the duplexer is designed not to impact the TX power transmission except for introducing insertion loss. However, the isolation demands to achieve this goal can be extremely high. For example, in an FDD BS, more than 80 dB of isolation may be demanded of the duplexer due to the very large gap between the high transmission power for the DL TX band and the low sensitivity level for the UL RX band. As a result, the duplexer is of high cost and large form factor since more cavity taps are equipped to meet the extremely high isolation demand.

Embodiments of the present disclosure additionally recognize that a purely digital domain active self-interference cancelation (SIC) system can reduce duplexer isolation requirements by providing effective TX-RX isolation, but this introduces new challenges. The dynamic range of the main path circuitry and the coupled path circuitry, both of which will be described further below, may be too high to process. Additionally, non-linearity of the low noise amplifier (LNA) and gain blocks in the main path circuitry can degrade or prevent digital SIC processing of the RX signal.

Accordingly, embodiments of the present disclosure provide a hybrid active SIC system, achieving high system TX-RX isolation and large TX power handling with low-cost, small-form-factor duplexers. The hybrid SIC system involves two stages of SIC: analog domain RF self-interference cancelation and digital domain self-interference cancelation. Introduction of the analog RF SIC component can solve the challenges created by the digital SIC component. The hybrid SIC system provides effective TX-RX isolation, and the total system TX-RX isolation is calculated by summing the duplexer isolation, the isolation due to RF SIC in analog circuits, and the digital domain isolation due to SIC processing. That is, the hybrid SIC system relieves the isolation burden on the duplexer, thereby allowing the use of smaller, less costly duplexers while achieving the same total TX-RX isolation as a larger, more costly duplexer. It is understood that relieving the isolation burden on a duplexer in an FDD wireless communication device is one application for the hybrid SIC system, and the hybrid SIC system could be used in other devices for different applications.

Embodiments of the present disclosure can provide the analog domain component of the active hybrid SIC system in both of the UL and DL frequency bands of an FDD RX signal. For simplicity, the UL and DL band are discussed from the perspective of the BS, but it is understood that the same system can be applied in the UE. The analog RF SIC circuit reduces TX leakage and TX noise level from an FDD TX signal, which relieves isolation requirements on duplexer and relieves constraints on the digital domain SIC component. In the meantime, the analog RF SIC circuit reduces the overall signal power of the FDD RX signal at the input to the RX chain, which provides two benefits.

First, analog RF SIC in the DL band reduces the dynamic range of the RX signal. The smallest power level component of the RX signal is comparable to the RX noise floor, and the largest is the DL band signal. The signal power in the DL band is much higher than the RX noise floor, so the RX signal has a high dynamic range without the reduction in signal power provided by the analog RF SIC in the DL band. Reducing the dynamic range of the RX signal can help improve the signal resolution and meet a required signal-to-noise ratio (SNR) with a specified bit width constraint for digital domain processing, which is determined by the bit width of the ADC used to convert the RX signal into the digital domain. The analog RF SIC in the DL band can relieve the bit-width requirements of the ADC, which in turn reduces the area, cost, and power consumption of digital circuits and systems while improving their performance.

Second, by reducing the signal power in the DL band of the RX signal, analog RF SIC in the DL band reduces the overall power of the RX signal. This is because the signal power in the DL band makes up the large majority of the RX signal. By reducing overall RX signal power, analog RF SIC in the DL band can avoid generating non-linearity in the RX chain, because non-linearity is generated by the low noise amplifier (LNA) and gain blocks in the RX chain when input power is high. This non-linearity is an unexpected signal component that degrades equalization-based digital domain SIC performance, because non-linear distortion in the signal cannot be modeled and canceled out properly by the equalization based SIC, as will be described further herein below. If this distortion is not properly canceled out by the digital domain SIC it becomes interference in the UL band, degrading the receiver performance. Accordingly, reducing the power level in the DL band can relax constraints on selection of the LNA and other amplifiers in the RX chain.

Embodiments of the present disclosure can provide the analog RF SIC as a single component that provides the above-described power reductions in both the UL band and DL band, or as separate TX side and RX side analog RF SIC components. Embodiments of the present disclosure provide the single RF SIC component by sampling a TX signal at its input to a duplexer (e.g., at its input to a transmitter-side filter of the duplexer), inputting the sampled TX signal to a multi-tap analog RF circuit with fixed delay at each tap, phase shifting and attenuates the delayed sample at each tap, and combining the outputs of each tap with an RX signal at its output from the duplexer (e.g., at its output from a receiver-side filter of the duplexer) to provide the above-discussed effects in the UL band and the DL band of the RX signal.

Embodiments of the present disclosure that provide separate TX side and RX side analog RF SIC components provide the TX side analog RF SIC component by sampling a TX signal at its input to a transmitter-side filter of a duplexer, inputting the sampled TX signal to a multi-tap analog RF circuit with fixed delay at each tap, phase shifting and attenuating the delayed sample at each tap, and combining the outputs of each tap with the TX signal at its output from the transmitter-side filter of the duplexer to provide the above-discussed effects in the UL band of the RX signal.

Embodiments of the present disclosure that provide separate TX side and RX side analog RF SIC components provide the RX side analog RF SIC component by sampling an RX signal at its input to a receiver-side filter of a duplexer, inputting the sampled RX signal to a multi-tap analog RF circuit with fixed delay at each tap, phase shifting and attenuating the delayed sample at each tap, and combining the outputs of each tap with the RX signal at its output from the receiver-side filter of the duplexer to provide the above-discussed effects in the DL band of the RX signal.

Embodiments of the present disclosure provide the digital domain component of the active hybrid SIC system by sampling a TX signal at its input to a duplexer (e.g., at its input to a transmitter-side filter of the duplexer), equalizing the sampled TX signal with an RX signal, and subtracting the equalized TX signal from the RX signal to cancel effects of TX leakage and TX noise floor that are induced in the RX signal by the TX signal.

Embodiments of the present disclosure also recognize that the disclosed hybrid SIC solution can be used in cross division duplex (XDD) systems as an alternative SIC solution. XDD enhances the UL coverage of TDD carriers without sacrificing DL data throughput. XDD allows the UE to transmit the uplink signal while the BS transmits the downlink signal at the same time, in the same spectrum within the same TDD band. That is, XDD allows full duplex communication similar to FDD, but within TDD bands. The UE's uplink can be scheduled with more opportunities in both time and frequency domain, therefore the coverage can be extended compared to the TDD systems.

Embodiments of the present disclosure use analog-to-digital converters (ADCs) and digital-to-analog converters (DACs). The terms ADC and DAC are sometimes synonymous with direct RF sampling ADC (RFADC) and direct RF sampling DAC (RFDAC), respectively. RFADCs and RFDACs do not require additional downconversion from RF or upconversion to RF. For example, an RFADC can digitize RF signal inputs, and downconversion to baseband is performed in the digital domain by the RFADC. Similarly, an RFDAC can receive baseband or intermediate frequency (IF) inputs, perform upconversion in the digital domain, and output analog RF signals.

FIG. 1 illustrates example wireless system 100, which transmits signals according to the principles of the present disclosure. In the illustrated embodiment, wireless system 100 includes a transmission point (e.g., an Evolved Node B (eNB), NodeB, or gNodeB (gNB)), such as base station (BS) 102. BS 102 may be in communication with other base stations and with the Internet or a similar IP-based system (not shown).

BS 102 provides wireless broadband access to the Internet to a user equipment (UE) 104 (e.g., mobile phone, mobile station, or subscriber station) within a coverage area of BS 102. UE 104 may access voice, data, video, video conferencing, and/or other broadband services via the Internet. UE 104 may be associated with an access point (AP) of a WiFi WLAN. UE 104 may be any of a number of mobile devices, including a wireless-enabled laptop computer, wireless-enabled personal computer, personal data assistant, notebook, handheld device, or other wireless-enabled device. While only one base station and one user equipment are depicted in FIG. 1, it is understood that wireless system 100 may provide wireless broadband access to additional user equipment.

In this embodiment, wireless system 100 operates using frequency division duplexing (FDD), with two separate frequency bands, or channels, assigned for downlink (DL) and uplink (UL) communications. From the perspective of the BS 102, DL communications are transmitted signals, and UL communications are received signals. From the perspective of the UE 104, DL communications are received signals, and UL communications are transmitted signals. DL band 106 and UL band 108 are assigned with a guard band (GB) 110 between them to reduce interference between the DL band 106 and UL band 108 during operation. The guard band may be tens or hundreds of MHz. In spite of the guard band, there is still significant leakage of transmission power into the receive band, as transmission power at the point of transmission is significantly higher than reception power at the point of reception.

Figure 2:
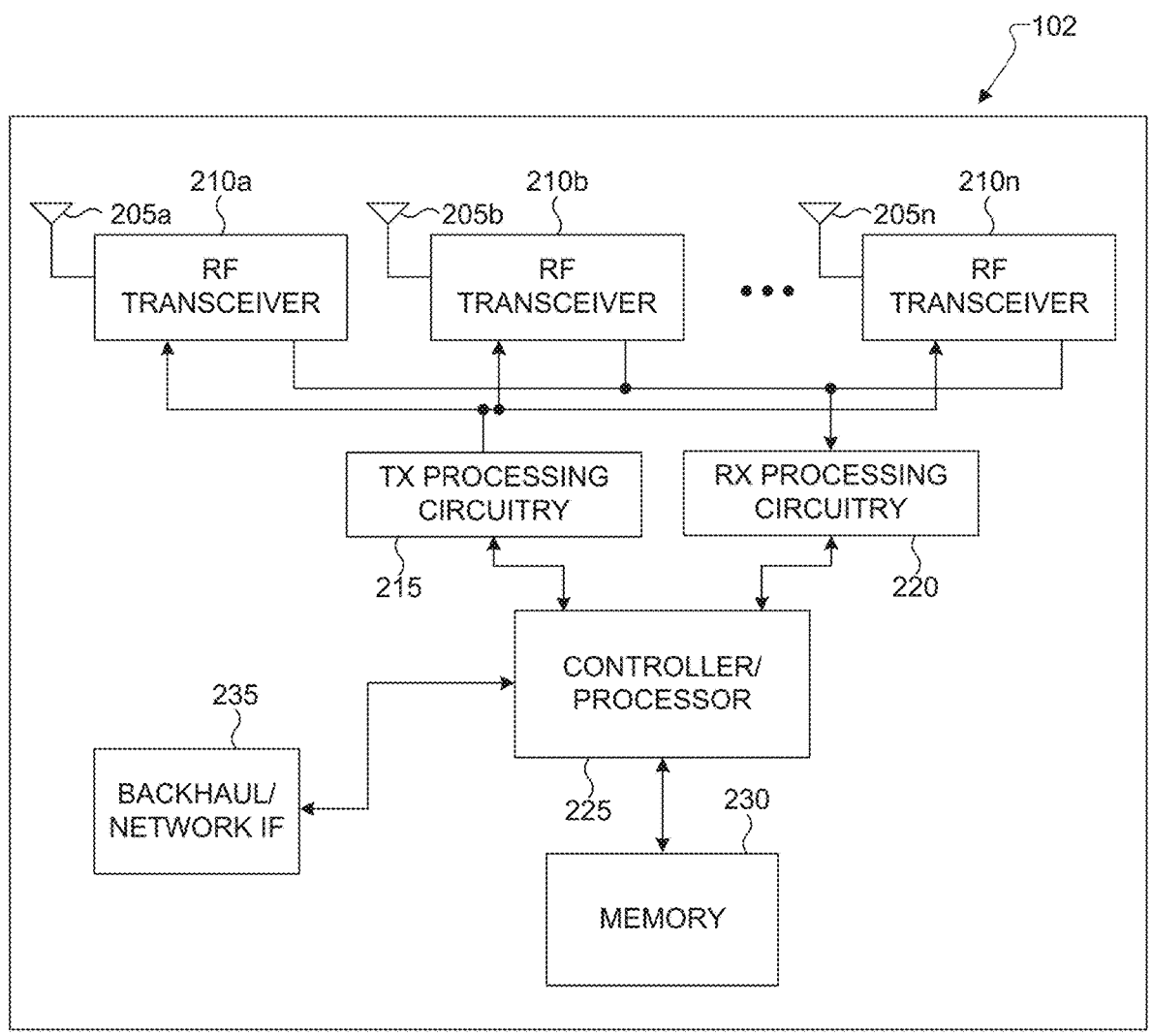
FIG. 2 illustrates an example base station (BS) according to embodiments of the present disclosure.

FIG. 2 illustrates an example BS 102 according to embodiments of the present disclosure. The embodiment of the BS 102 illustrated in FIG. 2 is for illustration only, and the BS 102 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UE 104 or other UEs in the system 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-convert the baseband or IF signals to outgoing RF signals that are transmitted via the antennas 205a-205n.

The RF transceivers 210a-210n are FDD transceivers that each include a duplexer to facilitate simultaneous reception of the incoming RF signals and transmission of the outgoing RF signals. The duplexers also provide isolation between the incoming and outgoing RF signals. In some embodiments, the RF transceivers 210a-210n include hybrid active SIC processes that operate in the analog and digital domains to further isolate the incoming RF signals from the outgoing RF signals, as will be further described below. In other embodiments, the TX processing circuitry 215 and/or the RX processing circuitry 220 include this hybrid active SIC process. In some embodiments, only the analog portion of the hybrid active SIC process is implemented—in such cases the hybrid active SIC process may be referred to as an analog RF SIC process. The digital portion of the hybrid active SIC process can be implemented using dedicated digital domain hardware, such as an application-specific integrated circuit (ASIC) or a field-programmable gate array (FPGA). In some embodiments, the hybrid active SIC process is implemented in an RFIC. The digital portion of the hybrid active SIC process can also be implemented in the controller/processor 225.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225.

The controller/processor 225 is also capable of executing programs and other processes resident in the memory 230, such as an operating system (OS). The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BSs over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a random access memory (RAM), and another part of the memory 230 could include a Flash memory or other read-only memory (ROM).

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
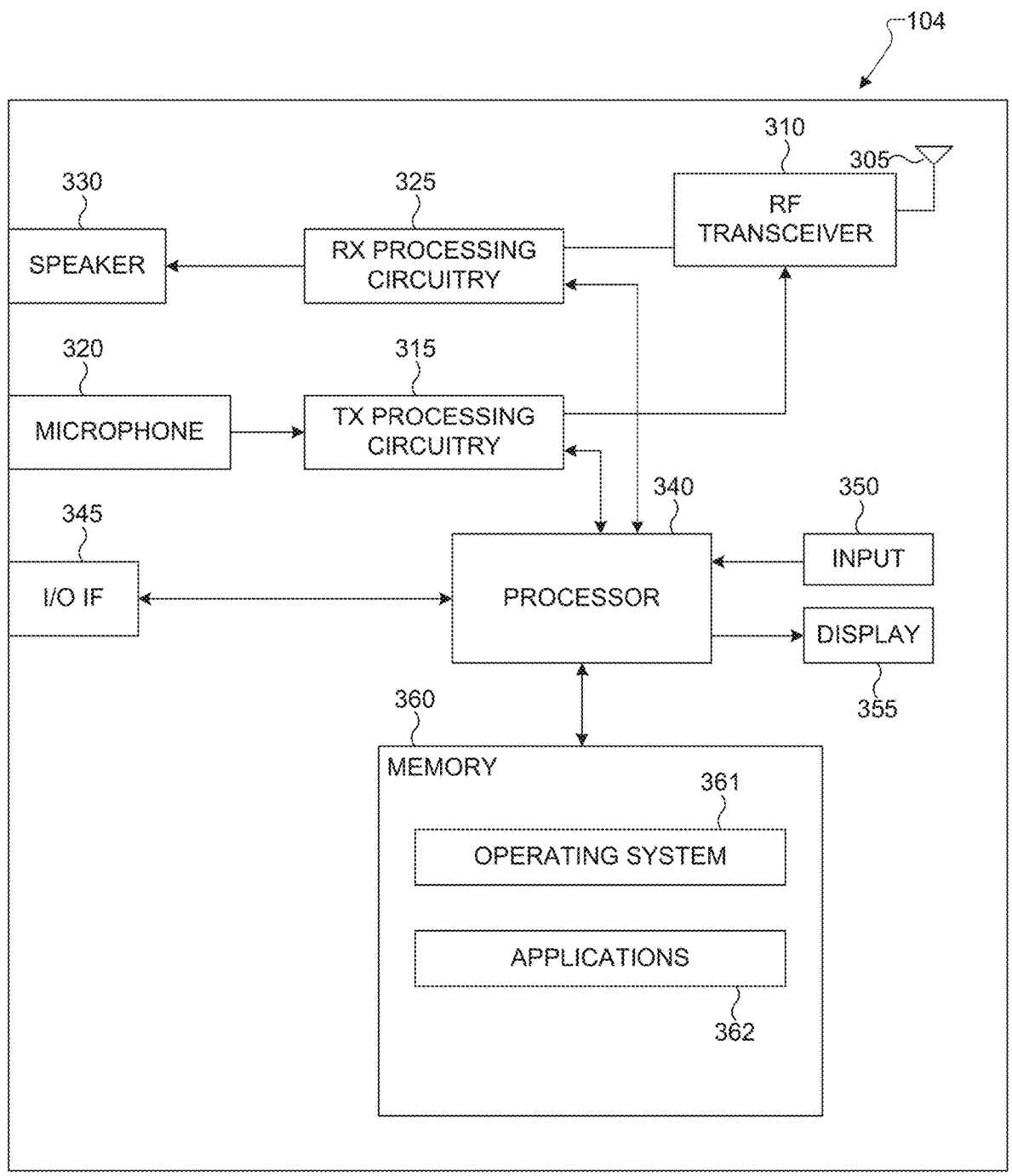
FIG. 3 illustrates an example user equipment (UE) according to embodiments of the present disclosure.

FIG. 3 illustrates an example UE 104 according to embodiments of the present disclosure. The embodiment of the UE 104 illustrated in FIG. 3 is for illustration only, and the UE 104 of FIG. 1 could have the same or similar configuration. UEs come in a wide variety of configurations, and FIG. 3 does not limit the scope of this disclosure to any particular implementation of a UE.

As shown in FIG. 3, the UE 104 includes an antenna 305, a radio frequency (RF) transceiver 310, TX processing circuitry 315, a microphone 320, and receive (RX) processing circuitry 325. The UE 104 also includes a speaker 330, a processor 340, an input/output interface (I/O IF) 345, a touchscreen 350, a display 355, and a memory 360. The memory 360 includes an OS 361 and one or more applications 362.

The RF transceiver 310 receives, from the antenna 305, an incoming RF signal transmitted by a BS, such as BS 102, of the system 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an outgoing RF signal that is transmitted via the antenna 305.

The RF transceiver 310 is an FDD transceiver that includes a duplexer to facilitate simultaneous reception of the incoming RF signal and transmission of the outgoing RF signal. The duplexer also provides isolation between the incoming and outgoing RF signals. In some embodiments, the RF transceiver 310 includes a hybrid active SIC process that operate in the analog and digital domains to further isolate the incoming RF signal from the outgoing RF signal, as will be further described below. In other embodiments, the TX processing circuitry 315 and/or the RX processing circuitry 325 include this hybrid active SIC process. In some embodiments, only the analog portion of the hybrid active SIC process is implemented—in such cases the hybrid active SIC process may be referred to as an analog RF SIC process. The digital portion of the hybrid active SIC process can be implemented using dedicated digital domain hardware, such as an ASIC or an FPGA. In some embodiments, the hybrid active SIC process is implemented in an RFIC. The digital portion of the hybrid active SIC process can also be implemented in the processor 340.

The processor 340 can include one or more processors or other processing devices and execute the OS 361 stored in the memory 360 in order to control the overall operation of the UE 104. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI feedback on uplink channel. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 104 with the ability to connect to other devices, such as laptop computers and handheld computers. The I/O interface 345 is the communication path between these accessories and the processor 340.

The processor 340 is also coupled to the touchscreen 350 and the display 355. The operator of the UE 104 can use the touchscreen 350 to enter data into the UE 104. The display 355 may be a liquid crystal display, light emitting diode display, or other display capable of rendering text and/or at least limited graphics, such as from web sites.

The memory 360 is coupled to the processor 340. Part of the memory 360 could include a RAM, and another part of the memory 360 could include a Flash memory or other ROM.

Although FIG. 3 illustrates one example of UE 104, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 104 configured as a mobile telephone or smartphone, UEs could be configured to operate as other types of mobile or stationary devices.

Figure 4A:
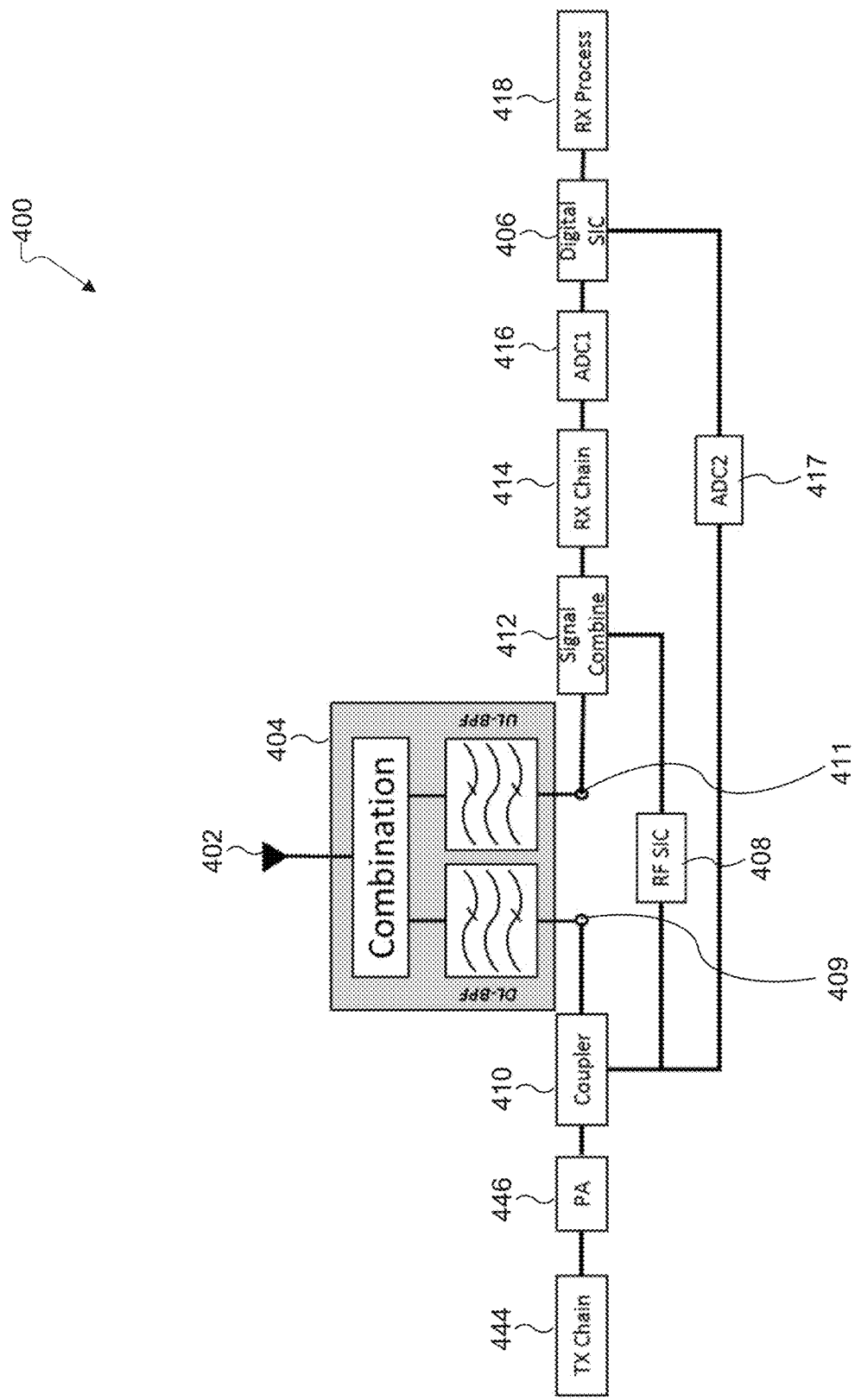
FIG. 4A illustrates a block diagram of an example FDD communication device according to embodiments of the present disclosure.
Figure 4B:
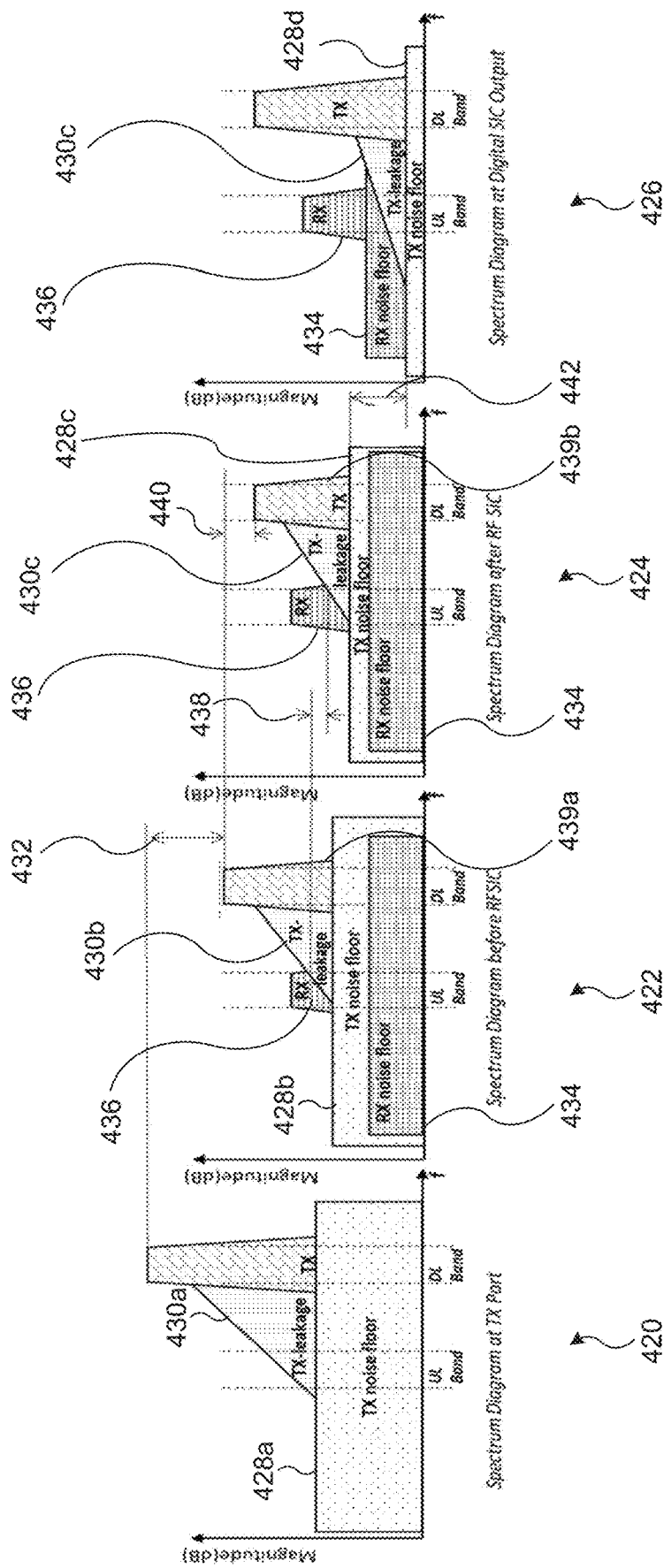
FIG. 4B illustrates spectrum diagrams of example signals at various points in the FDD communication device of FIG. 4A according to embodiments of the present disclosure.

FIG. 4A illustrates a block diagram of an example FDD communication device 400 according to embodiments of the present disclosure. FIG. 4B illustrates spectrum diagrams of example signals at various points in the FDD communication device 400 according to embodiments of the present disclosure. For convenience, the FDD communication device 400 is discussed below as being implemented in an FDD BS, however it is understood that the communication device 400 could be implemented in an FDD UE. In some embodiments, the FDD communication device 400 could be implemented in a BS 102 or UE 104 of FIGS. 1-3. It is understood that any number of communication devices 400 could be included in one BS 102 or UE 104. For example, an FDD BS or UE using a multiple-input multiple-output (MIMO) antenna array could include a communication device 400 for each antenna of the array.

The FDD communication device 400 includes an antenna 402, a duplexer 404, a digital SIC process 406, analog RF SIC circuitry 408, a coupler 410, and a signal combiner 412. The antenna 402 is coupled to the duplexer 404. The duplexer 404 supports FDD communication, and facilitates frequency division duplex transmission and reception through antenna 402. The duplexer 404 accordingly has a TX port 409, which transmits the DL TX signal to radiation through antenna 402, and an RX port 411, which receives the UL RX signal through antenna 402. The duplexer 404 provides isolation between the DL TX frequency band and the UL RX frequency band. This isolation of the duplexer 404 reduces the TX leakage and TX noise floor induced in the UL RX frequency band in the RX circuits.

The coupler 410 couples a small part of the DL TX signal from the TX port 409 to the digital SIC process 406 and the analog RF SIC circuitry 408. In some embodiments, the coupler 410 only couples the small part of the DL TX signal to the digital SIC process 406, and an additional separate coupler couples another part of the DL TX signal from the TX port 409 to the analog RF SIC circuitry 408. The sample of the DL TX signal can be less than 1% of the total power of the DL TX signal. The remaining power of the DL TX signal is passed to the TX port 409 to be radiated into the air interface. The digital SIC process 406 and the analog RF SIC circuitry 408 each provide effective isolation between the DL TX frequency band and the UL RX frequency band, which is additive with the isolation provided by the duplexer 404 to provide the total TX-RX isolation of the FDD communication device 400.

The analog RF SIC circuitry 408 is implemented in the analog domain. Accordingly, the analog sample of the DL TX signal is input directly to the analog RF SIC circuitry 408. The output of the analog RF SIC circuitry 408 is combined with the UL RX signal at the RX port 411 through the signal combiner 412. In some embodiments, the signal combiner 412 is a coupler. The analog RF SIC circuitry 408 performs active self-interference cancelation in both the UL RX band and DL TX band. The active self-interference cancelation in the UL RX band reduces TX leakage and TX noise level in the UL RX band. The active self-interference cancelation in the DL TX band reduces the power level of the DL TX signal in the UL RX band—thereby reducing the overall signal power of the UL RX signal—before input to the RX chain 414. The output of the analog RF SIC circuitry 408 corresponds to the spectrum diagram 424 of FIG. 4B.

Figure 4C:
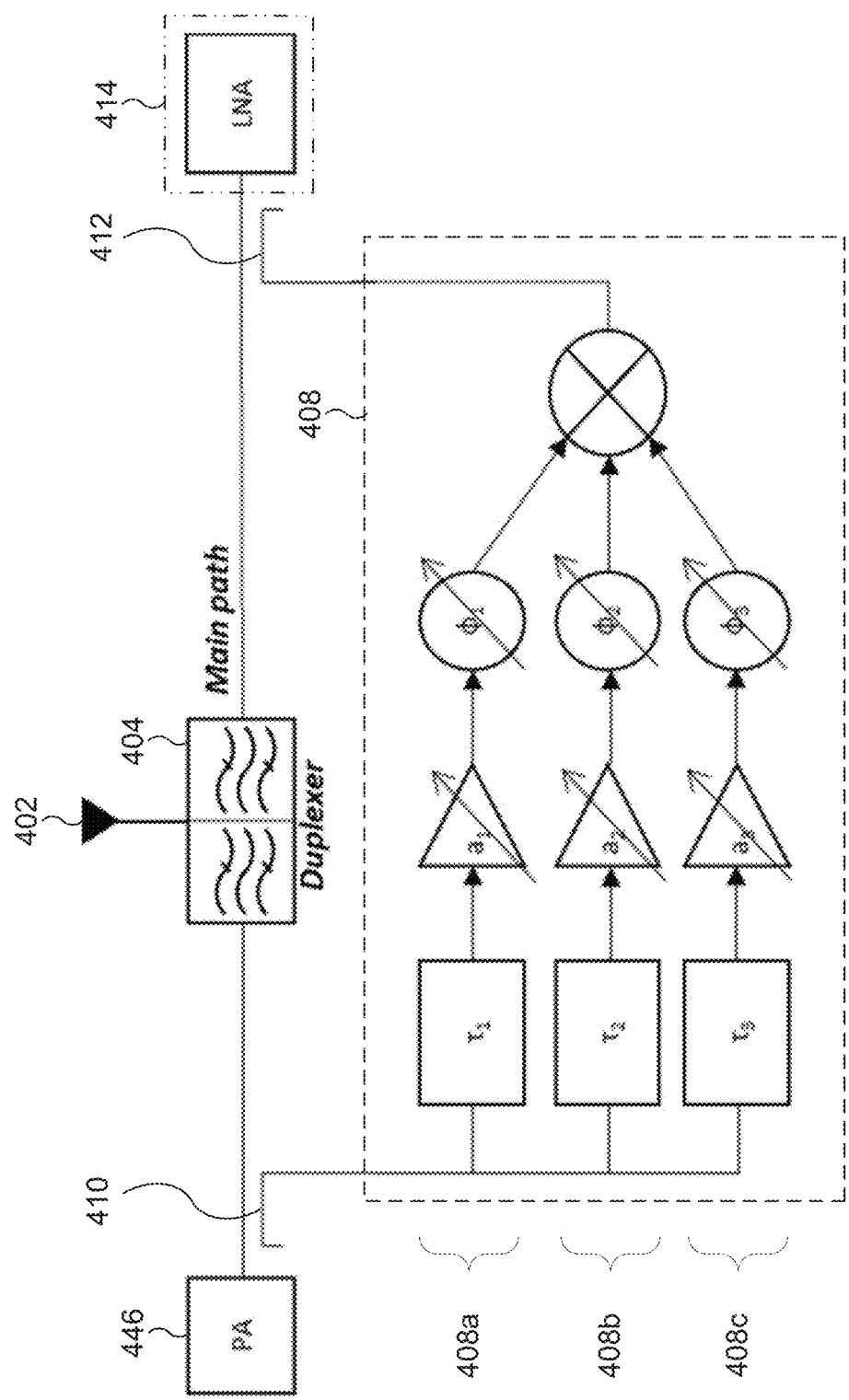
FIG. 4C illustrates details of the analog RF SIC circuitry according to an embodiment of FIG. 4A.

FIG. 4C illustrates details of the analog RF SIC circuitry 408 according to an embodiment of FIG. 4A. In this embodiment, the analog RF SIC circuitry 408 has three taps (or branches) 408a, 408b, and 408c. The three taps 408a, 408b, and 408c have fixed delays of $\tau_1$, $\tau_2$, and $\tau_3$, respectively, optional tunable attenuations $a_1$, $a_2$, and $a_3$, respectively, and tunable phase shifts $\phi_1$, $\phi_2$, and $\phi_3$, respectively. In this embodiment, the first two taps 408a and 408b are designed for RF SIC in the DL TX band and the third tap 408c is designed for RF SIC in the UL RX band. By tuning the attenuators and phase shifters, the RF SIC shape and frequency can be designed to meet the digital SIC requirements. Furthermore, it is understood that additional taps could be added to the analog RF SIC circuitry 408. In other embodiments of FIG. 4A, the analog RF SIC circuitry 408 could be subdivided into separate TX side and RX side analog RF SIC circuitry, as will be described further below, e.g., with respect to FIG. 5A.

Returning to FIG. 4A, the digital SIC process 406 is implemented in the digital domain. Accordingly, after the UL RX signal is combined with the output of the analog RF SIC circuitry 408 at signal combiner 412, the UL RX signal passes through the RX chain 414, which can include a first direct RF sampling analog-to-digital converter (RFADC) 416 (although the RFADC 416 is illustrated separate from the RX chain 414 here, for clarity), before input to the digital SIC process 406. This signal path, from the RX port 411 to the digital SIC process 406, is herein referred to as the main path, and the signal input to the digital SIC process 406 from the main path is herein referred to as the main path signal.

Additionally, because the digital SIC process 406 is implemented in the digital domain, the sample of the DL TX signal from the coupler 410 is passed through a second RFADC 417 before input to the digital SIC process 406. This signal path, from the TX port 409 through the coupler 410 to the digital SIC process 406, is herein referred to as the coupled path (or the coupling path), and the signal input to the digital SIC process 406 from the coupled path is herein referred to as the coupled path signal. In this embodiment, due to the use of direct RF sampling in the RFADCs 416 and 417, no additional downconversion is performed on the RX signal in the main path, or on the sample of the DL TX signal in the coupled path, to lower the frequency range of the DL RX signal before input to the RFADCs 416 and 417, respectively.

In some embodiments, the digital SIC process 406 equalizes the coupled path signal to the main path signal, and then subtracts the equalized signal from the main path signal. As a result, since the coupled path only contains a TX-related signal, including TX leakage and TX noise floor in the UL RX frequency band, the output of the digital SIC process 406 is an SIC residual with the unmodified UL RX signal. The SIC residual corresponds to the spectrum diagram 426 of FIG. 4B, and the TX leakage and TX noise floor are canceled out to a level that is lower than the RX noise floor.

One embodiment of this process is explained as minimization of the error between the coupled signal x[n] passing through an equalizer h and the received signal, y[n] in the UL band, where n is the time index. This can be done as a calibration in the factory to compute the filter:

$$\hat{h} = \arg\min_h \|h * x[n] - y[n]\| \quad (1)$$

The FIR filter based equalization can be modeled in matrix format as:

$$h*x[n] = \begin{bmatrix} x[n-L+1] & \cdots & x[n] \\ \vdots & \ddots & \vdots \\ x[n+N-1] & \cdots & x[n+N-1] \end{bmatrix} \begin{bmatrix} h_0 \\ \vdots \\ h_{L-1} \end{bmatrix} = Xh \quad (2)$$

where L is the length of the equalization FIR filter, and N+L−1 is the length of samples in calculating the filters coefficients.

Using the least squares (LS) method to find the coefficients of the FIR filter:

$$\hat{h} = (X^T X + \lambda I)^{-1} X^T y \quad (3)$$

where y=[y[n] . . . y[n+N−1]]$^T$ is the received signal vector.

where λ is a regularization factor proposed by Tikhonov (See Tikhonov, A. et al., *Nonlinear Ill-posed problems*, London: Chapman & Hall, ISBN 0412786605, August 2018) which is chosen to improve the numerical stability of the LS problem.

In some embodiments, the requirement of the total amount of isolation provided by the duplexer 404 and the analog RF SIC circuitry 408 can be determined based on input constraints of the digital SIC process 406, and the digital SIC process 406 can be parameterized to provide additional effective isolation that is sufficient to reduce TX leakage and the TX noise floor in the UL RX band below the RX noise floor. This ensures that the quality of the UL RX signal is sufficient for RX processing by RX process 418. Alternatively, the input constraints of the digital SIC process 406 can be designed based on selected amounts of isolation provided by the duplexer 404 and the analog RF SIC circuitry 408. That is, there is a design trade-off between the three isolation components, which allows different designs to supply different amounts of isolation from each of the duplexer 404, the analog RF SIC circuitry 408, and the digital SIC process 406.

Spectrum diagrams 420, 422, 424, and 426 of FIG. 4B demonstrate an embodiment of the FDD communication device 400 in which the total isolation brings the TX noise floor and the TX leakage below the RX noise floor. Spectrum diagram 420 illustrates the frequency spectrum at TX port 409, and spectrum diagram 422 illustrates the frequency spectrum at RX port 411, before the analog RF SIC circuitry 408 output is applied. The TX noise floor 428a and the TX leakage 430a at the TX port 409 are a result of the effects of processing of the DL TX signal in the TX chain 444, which can include PA 446 (although PA 446 is illustrated separately from TX chain 444 here, for clarity). Comparing the TX noise floor 428a and the TX leakage 430a at the TX port 409 to the TX noise floor 428b and the TX leakage 430b at the RX port 411, the magnitude of the TX leakage and the TX noise floor are reduced at RX port 411 by a first amount that corresponds to the duplexer isolation 432 provided by the duplexer 404. At this point, the TX noise floor 428b and the TX leakage 430b are still above the RX noise floor 434, and would degrade the recovery of UL RX signal 436 if it were sent to RX process 418.

Spectrum diagram 424 illustrates the frequency spectrum at the output of the signal combiner 412, after applying the analog RF SIC circuitry 408 to the output of the RX port 411. Comparing the TX noise floor 428b and the TX leakage 430b at the RX port 411 to the TX noise floor 428c and the TX leakage 430c at the output of the signal combiner 412, the magnitude of the TX leakage and the TX noise floor are reduced by a second amount at the output of the signal combiner 412. This second amount corresponds to the effective SIC isolation 438 provided in the UL RX band by the analog RF SIC circuitry 408. In embodiments of the FDD communication device 400 wherein the analog RF SIC circuitry 408 is subdivided into separate TX side and RX side analog RF SIC circuitry, the effective SIC isolation 438 is provided by the TX side analog RF SIC circuitry.

Furthermore, comparing the DL TX signal 439a at the RX port 411 to the DL TX signal 439b at the output of the signal combiner 412 (after applying the analog RF SIC circuitry 408), the magnitude of the DL TX signal component is significantly reduced at the output of the signal combiner 412. This reduction corresponds to the effective SIC isolation 440 provided in the DL TX band by the analog RF SIC circuitry 408. In embodiments of the FDD communication device 400 wherein the analog RF SIC circuitry 408 is subdivided into separate TX side and RX side analog RF SIC circuitry, the effective SIC isolation 440 is provided by the RX side analog RF SIC circuitry.

Spectrum diagram 426 illustrates the frequency spectrum at the output of the digital SIC process 406. Comparing the TX noise floor 428c and the TX leakage 430c at the output of the signal combiner 412 (after applying the analog RF SIC circuitry 408) to the TX noise floor 428d and the TX leakage 430d at the output of the digital SIC process 406, the magnitude of the TX leakage and the TX noise floor are reduced by a third amount at the output of the digital SIC process 406. This third amount corresponds to the effective SIC isolation 442 provided by the digital SIC process 406. Further comparing the TX noise floor 428d and the TX leakage 430d at the output of the digital SIC process 406 to the original TX noise floor 428a and the original TX leakage 430a at the TX port 409, it is seen the total TX-RX isolation provided by the duplexer 404, the analog RF SIC circuitry 408, and the digital SIC process 406 is the sum of the duplexer isolation 432, the effective SIC isolation 438 provided in the UL RX band by the analog RF SIC circuitry 408, and the effective SIC isolation 442 provided by the digital SIC process 406. This result is comparable to that which could be achieved with a larger, more costly duplexer having an isolation equivalent to the sum of the duplexer isolation 432, the effective SIC isolation 438, and the effective SIC isolation 442.

Although FIG. 4A illustrates one example of FDD communication device 400, various changes may be made to FIG. 4A. For example, various components in FIG. 4A could be combined, further subdivided, or omitted and additional components could be added according to particular needs. In particular, the analog RF SIC circuitry 408 could be subdivided into separate TX side and RX side analog RF SIC circuitry, as will be described further below.

Figure 5A:
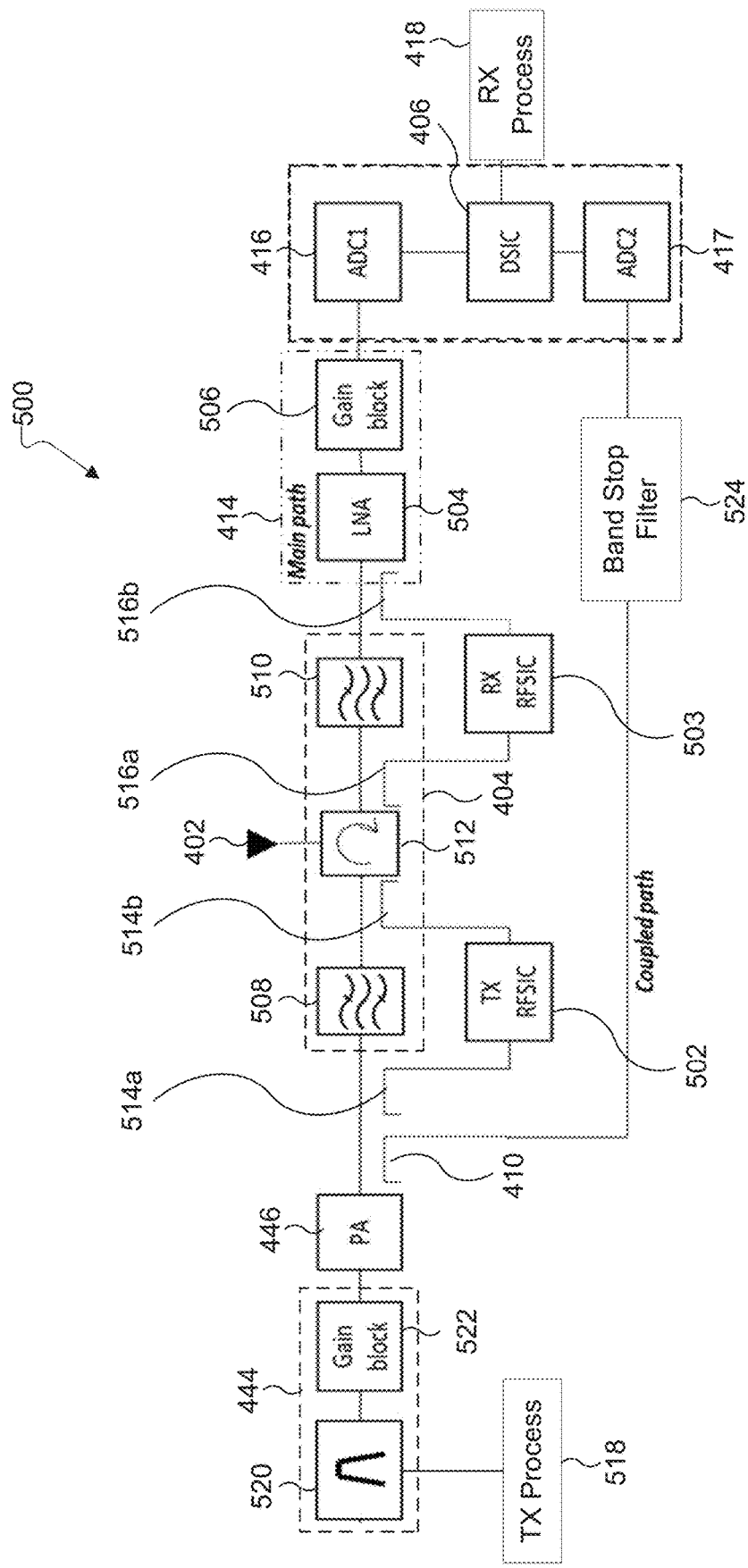
FIG. 5A illustrates a block diagram of an example FDD communication device according to embodiments of the present disclosure.

FIG. 5A illustrates a block diagram of an example FDD communication device 500 according to embodiments of the present disclosure. FDD communication device 500 is an embodiment of the FDD communication device 400 of FIG. 4A. In this embodiment, the analog RF SIC circuitry 408 is replaced by separate analog TX RF SIC circuitry 502 (or analog TX side RF SIC circuitry) and analog RX RF SIC circuitry 503 (or analog RX side RF SIC circuitry). Additionally, in this embodiment, FDD communication device 500 operates using direct RF sampling ADCs for RFADCs 416 and 417. That is, no additional downconversion is performed on the RX signal in the main path, or on the sample of the DL TX signal in the coupled path, to lower the frequency range of the DL RX signal before input to the RFADCs 416 and 417, respectively. In the main path, RX chain 414 includes a low noise amplifier (LNA) 504 and a gain block 506.

The duplexer 404 in this embodiment is represented by a TX filter 508, an RX filter 510, and a circulator 512. The analog TX RF SIC circuitry 502 is coupled in parallel to the TX filter 508, and the analog RX RF SIC circuitry 503 is coupled in parallel to the RX filter 510. Specifically, a coupler 514a may be used to couple a small portion of the DL TX signal from the TX port 409 (i.e., at the input of the TX filter 508) into the analog TX RF SIC circuitry 502, and a coupler 514b may be used to combine the output of the analog TX RF SIC circuitry 502 with the output of the TX filter 508 (i.e., at the input of the circulator 512). Likewise, a coupler 516a may be used to couple a small portion of the UL RX signal from the output of the circulator 512 (i.e., at the input of the RX filter 510) into the analog RX RF SIC circuitry 503, and a coupler 516b may be used to combine the output of the analog RX RF SIC circuitry 503 with the output of the RX filter 510 (i.e., at the input of the RX chain 414).

Figure 5B:
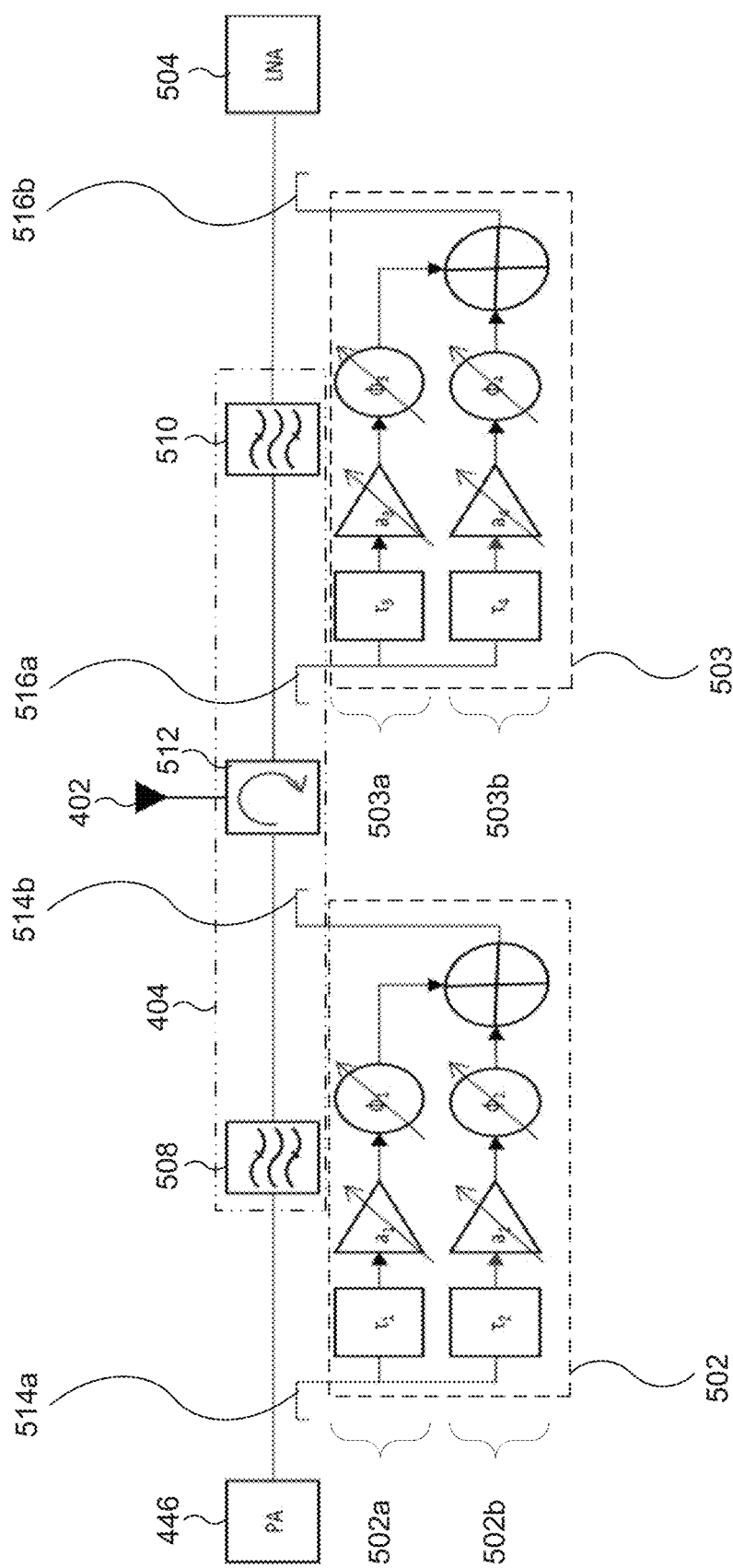
FIG. 5B illustrates details of the analog TX RF SIC circuitry and the analog RX RF SIC circuitry according to an embodiment of FIG. 5A.

FIG. 5B illustrates details of the analog TX RF SIC circuitry 502 and the analog RX RF SIC circuitry 503 according to an embodiment of FIG. 5A. In this embodiment, the analog TX RF SIC circuitry 502 has two taps (or branches) 502a and 502b. The two taps 502a and 502b have fixed delays of $\tau_1$ and $\tau_2$, respectively, optional tunable attenuations $a_1$ and $a_2$, respectively, and tunable phase shifts $\phi_1$ and $\phi_2$, respectively. By tuning the attenuators and phase shifters, the shape and frequency of the signal output by the analog TX RF SIC circuitry 502 can be designed to reduce leakage of the DL TX signal in the UL RX band (i.e., to reduce the power of the DL TX signal in the UL RX band)—and to meet the digital SIC requirements by lowering the power of the TX leakage and TX noise floor seen in the UL RX signal—when combined with the output of the TX filter 508. Although the analog TX RF SIC circuitry 502 is illustrated here as comprising two taps, it is understood that it could have any number of taps.

Furthermore, the analog RX RF SIC circuitry 503 has two taps 503a and 503b. The two taps 503a and 503b have fixed delays of $\tau_3$ and $\tau_4$, respectively, optional tunable attenuations $a_3$ and $a_4$, respectively, and tunable phase shifts $\phi_3$ and $\phi_4$, respectively. By tuning the attenuations and phase shifts, the shape and frequency of the signal output by the analog RX RF SIC circuitry 503 can be designed to reduce the power in the DL TX band of the UL RX signal—and to meet the digital SIC requirements by reducing input power to the LNA 504 to avoid introducing non-linearity to the input of the digital SIC process 406—when combined with the output of the RX filter 510. Although the analog RX RF SIC circuitry 503 is illustrated here as comprising two taps, it is understood that it could have any number of taps.

Returning to FIG. 5A, the coupler 410 couples a small part of the DL TX signal into the coupled path as the coupled path signal. The DL TX signal is output by the PA 446 after being generated by a TX process 518 and the TX chain 444. In this embodiment, the TX chain 444 includes an image rejection (IR) filter 520 that filters out from the DL TX signal the image spectrum in the Nyquist zones other than the interested one. The output of the IR filter 520 is passed through a gain block 522 that functions as a pre-driver before input to the PA 446.

In some embodiments, the coupled path has its own noise floor, which is independent from the TX noise floor and from the RX noise floor in the main path. Due to this independence, when the coupled path signal is equalized with the main path signal in the digital SIC process 406, the coupled path noise floor component will not be affected, and the attempt to subtract the equalized coupled path signal from the main path signal will result in adding the coupled path noise floor to the RX noise floor in the main path. The coupled path is designed to minimize the coupled path noise floor during the equalization based cancelation.

In some embodiments, to further increase the SNR of the coupled path signal, the power level of the coupled path signal could be amplified to obtain a very high signal power in the target UL RX frequency band before input to the second RFADC 417. A gain block could be included in the coupled path to perform this amplification. However, as the dominant power component in the coupled path signal is the DL TX signal component in the DL TX frequency band, amplifying the coupled path signal such that the signal power in the target UL RX frequency band is high would result in even higher signal power in the DL TX frequency band, which could generate non-linearity or saturate the second RFADC 417. To solve this problem, the coupled DL TX signal could be input to a DL bandstop filter (BSF) 524, also known as a band reject filter, before input to the coupled path gain block. The DL BSF 524 would filter out frequencies in the DL TX frequency band from the coupled DL TX signal before amplification by the coupled path gain block. This would also improve the dynamic range of the DL TX signal for input to the second RFADC 417. In other embodiments, the DL BSF 524 could be implemented without the coupled path gain block in order to reject components of the DL TX signal in the coupled path. This could provide dynamic range improvements at the second RFADC 417 even without the amplification.

At this point, the coupled path signal input to the digital SIC process 406 from the second RFADC 417 and the main path signal input to the digital SIC process 406 from the first RFADC 416 are dominated by UL RX signal components in the target UL RX frequency band. Accordingly, in some embodiments, the digital SIC process 406 is performed only on the target UL RX frequency band rather than on the entire frequency band of the system. The output of the digital SIC process 406 is the SIC residual which is provided to RX process 418 for further RX processing.

Although FIG. 5A illustrates one example of FDD communication device 500, various changes may be made to FIG. 5A. For example, various components in FIG. 5A could be combined, further subdivided, or omitted and additional components could be added according to particular needs.

Figure 6A:
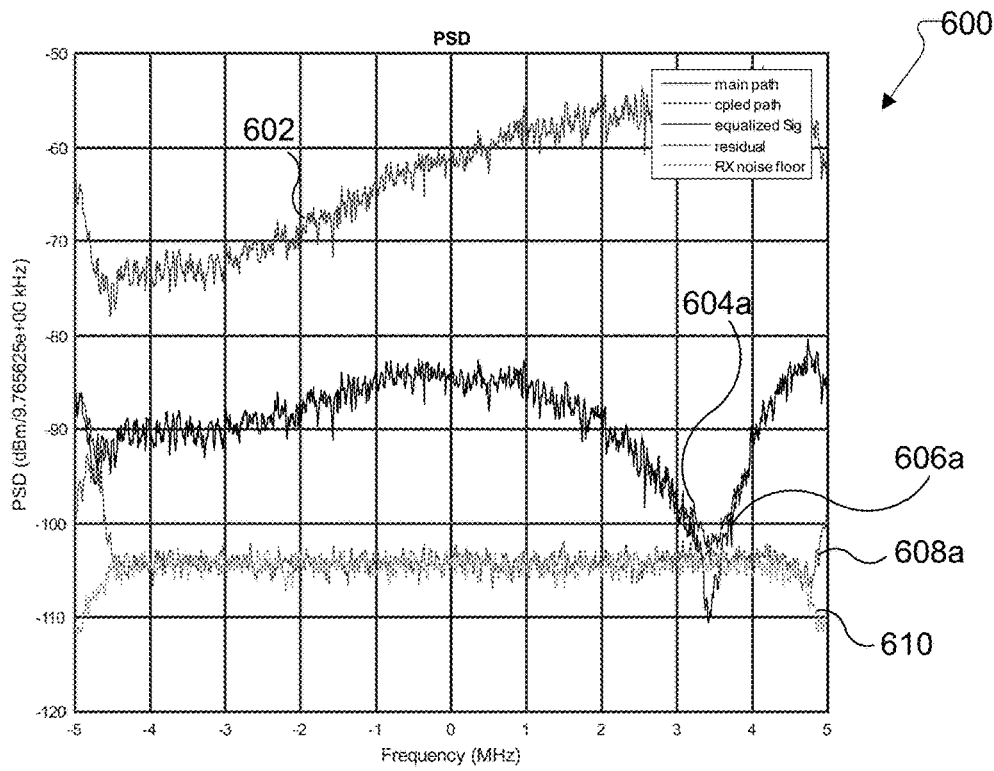
FIG. 6A illustrates a power spectral density (PSD) graph for the digital SIC process according to embodiments of the present disclosure.

FIG. 6A illustrates a power spectral density (PSD) graph 600 for the digital SIC process according to embodiments of the present disclosure. For example, the PSD graph 600 could represent the PSD of signals related to an embodiment using only the digital SIC process 406 without any analog RF SIC applied. In this embodiment, the PSD graph 600 represents the PSD of signals related to a DL TX signal generated in an example FDD system having a 10 MHz UL band 108 centered around 2432 MHz, a 20 MHz DL band 106 centered around 2455 MHz, and an 8 MHz guard band 110 allocated between the UL band 108 and the DL band 106. It is understood that the PSD graph 600 is merely an example, and the PSD of signals in the FDD communication devices 400 or 500 could vary significantly.

PSD graph 600 includes the coupled path signal PSD 602 at the input to the digital SIC process 406, the main path signal PSD 604a at the input to the digital SIC process 406, the equalized signal PSD 606a generated by the digital SIC process 406, the SIC residual PSD 608a output by the digital SIC process 406, and the RX noise floor signal PSD 610. In this embodiment digital SIC processing is performed only on the target UL RX frequency band. Accordingly, frequency components outside of the UL RX frequency band are filtered out and are not shown in FIG. 6A.

The coupled path signal PSD 602 is the PSD of the digitized coupled path signal at the output of the second RFADC 417, and includes the PSD of the TX leakage and TX noise floor within the UL RX frequency band, which is related to the TX leakage and TX noise floor induced within the UL RX frequency band in the main path signal. The main path signal PSD 604 is the PSD of the digitized main path signal at the output of the first RFADC 416, and includes the TX leakage and TX noise floor induced in the main path signal by the DL TX signal. For illustration of the digital SIC process, no UL RX signal is present in this example.

The equalized signal PSD 606a represents the result of equalizing the coupled path signal to the main path signal by the digital SIC process 406. The equalized signal PSD 606a nearly identically matches the main path signal PSD 604a. That is, the equalized signal PSD 606a nearly identically matches the PSD of the interference induced by the TX leakage and the TX noise floor in the UL RX band.

As described above, the equalized signal is subtracted from the main path signal. The PSD of the result of this subtraction is the SIC residual PSD 608a. The SIC residual PSD 608a is reduced to the RX noise floor PSD 610, indicating that the effects of the TX leakage and TX noise floor have been canceled out to the RX noise floor.

The effective TX-RX isolation provided by the digital SIC process 406 in the example of FIG. 6A is 20 dB. Accordingly, the isolation requirement of the duplexer 404 in the system is reduced by 20 dB. For example, if the TX-RX isolation requirement for the system is 90 dB, a duplexer with 70 dB can be combined with the digital SIC process 406 to achieve a total TX-RX isolation of 90 dB. The reduction in isolation requirement of the duplexer from 86 dB to 58 dB results in cost and hardware size savings for the system.

Figure 6B:
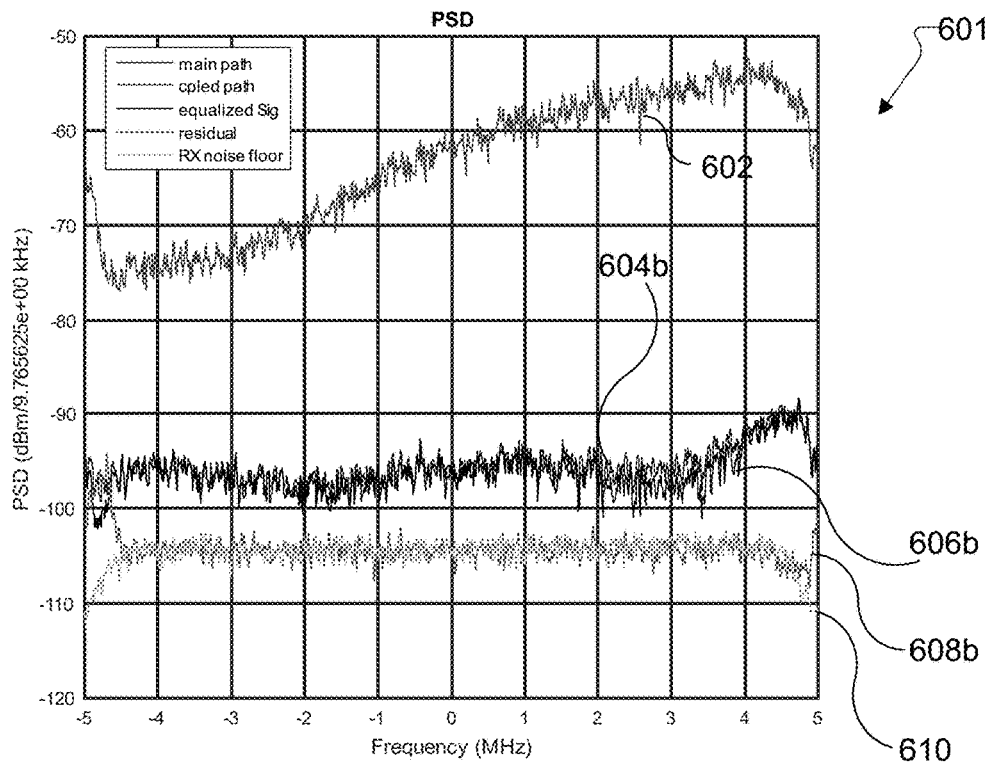
FIG. 6B illustrates a PSD graph for the hybrid SIC process according to embodiments of the present disclosure.

FIG. 6B illustrates a PSD graph 601 for the hybrid SIC process according to embodiments of the present disclosure. For example, the PSD graph 601 could represent the PSD of signals related to an embodiment using all of the analog TX RF SIC circuitry 502, the analog RX RF SIC circuitry 503, and the digital SIC process 406, as discussed above with respect to, e.g., FIG. 5A. In this embodiment, the PSD graph 601 represents the PSD of signals related to the same DL TX signal represented in the PSD graph 600 of FIG. 6A, but with the addition of the analog RF SIC to the system.

PSD graph 601 includes the coupled path signal PSD 602 at the input to the digital SIC process 406, the main path signal PSD 604b at the input to the digital SIC process 406, the equalized signal PSD 606b generated by the digital SIC process 406, the SIC residual PSD 608b output by the digital SIC process 406, and the RX noise floor signal PSD 610.

The equalized signal PSD 606b represents the result of equalizing the coupled path signal to the main path signal by the digital SIC process 406. Similar to the equalized signal PSD 606a of the PSD graph 600, the equalized signal PSD 606b nearly identically matches the main path signal PSD 604b. That is, the equalized signal PSD 606b nearly identically matches the PSD of the interference induced by the TX leakage and the TX noise floor in the UL RX band.

As a result, the SIC residual PSD 608b is reduced to the RX noise floor PSD 610 upon subtraction of the equalized signal from the main path signal, similar to the SIC residual PSD 608a of the PSD graph 600. That is, the same result of canceling out the effects of the TX leakage and TX noise floor are achieved.

However, in comparison to the PSD graph 600, it can be seen that the main path signal PSD 604b is roughly 10 dB lower than the main path signal PSD 604a, representing an additional 10 dB of TX-RX isolation in the hybrid SIC system as compared to the digital SIC only system. This is the result of the applied analog RF SIC circuitry, meaning that the effective TX-RX isolation provided by the analog RF SIC circuitry is 10 dB, resulting in a total effective TX-RX isolation of 30 dB provided by both the analog RF SIC circuitry and the digital SIC process. Accordingly, the isolation requirement of the duplexer 404 in the hybrid SIC system is reduced by an additional 10 dB as compared to the digital SIC only system, thus reducing the size, cost, and power consumption of the device (e.g., the BS 102) containing the duplexer 404. Alternatively, the constraints of the digital SIC process 406 could be relaxed.

Although FIGS. 6A and 6B illustrate one example set of frequency bands allocated for communication in an FDD system and corresponding example PSD graphs for the hybrid SIC system and the digital-only SIC process, various changes may be made to FIGS. 6A and 6B. For example, different frequency bands could be allocated, and different signals could be used as the transmit signal.

Figure 7A:
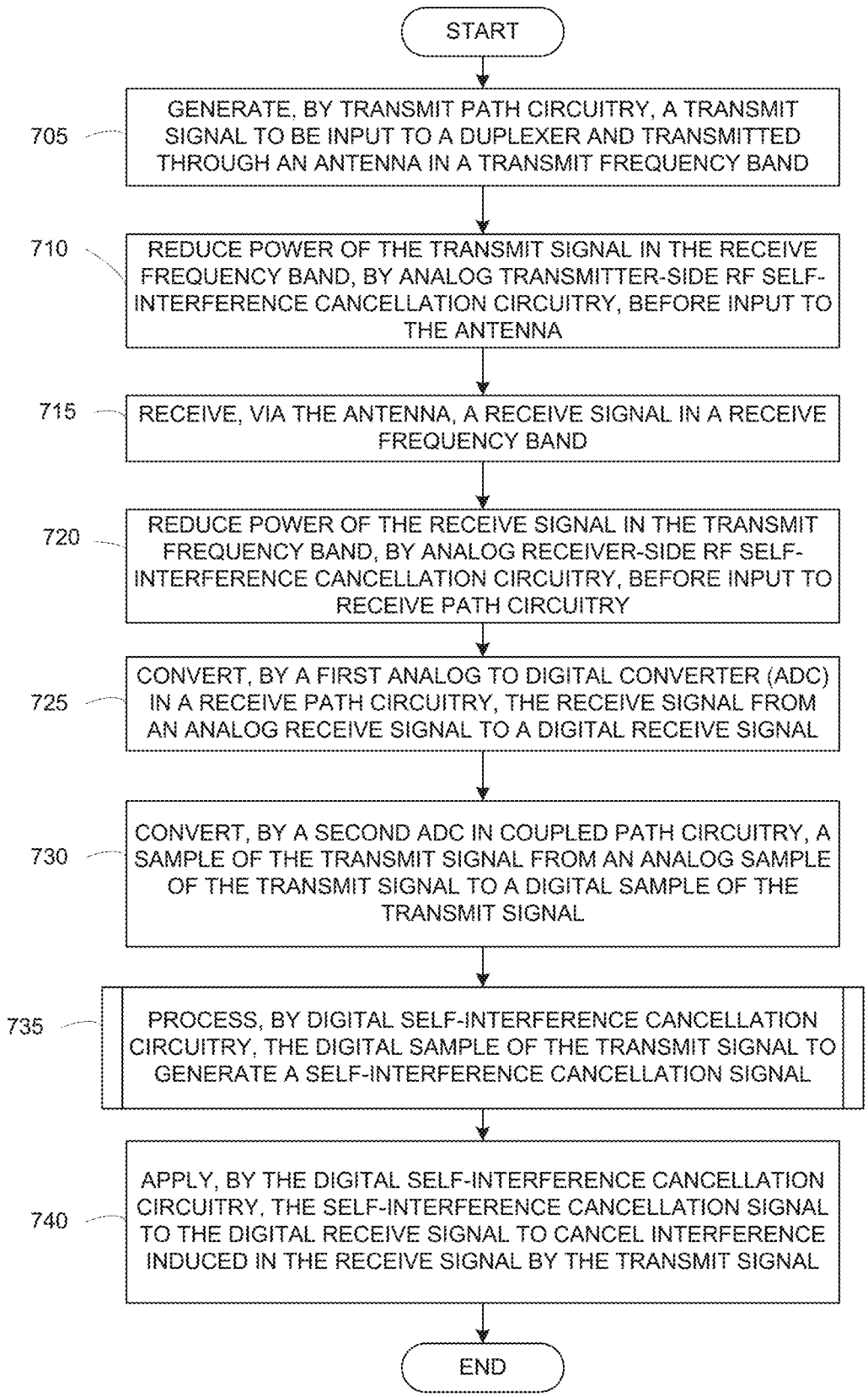
FIGS. 7A-7B illustrate embodiments of a process for self-interference cancelation in accordance with various embodiments of the present disclosure.
Figure 7B:
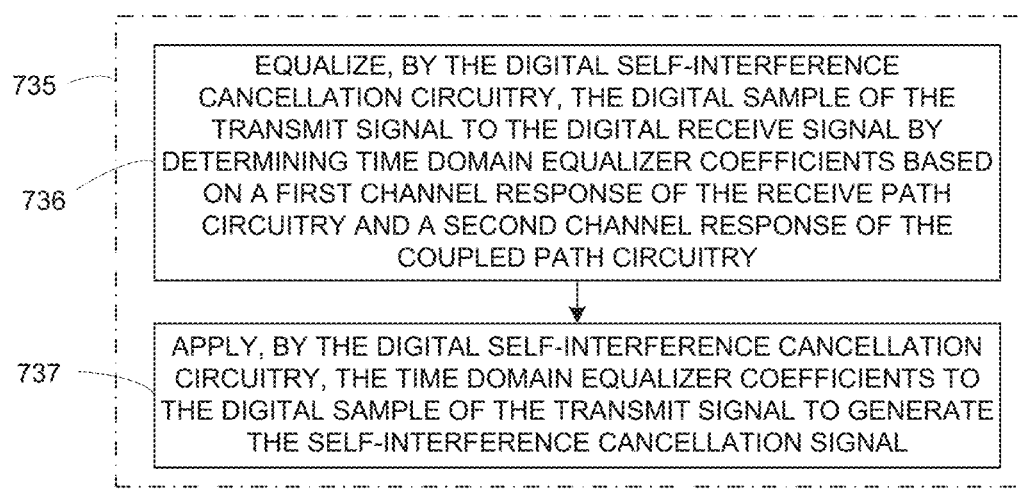

FIGS. 7A-7B illustrate embodiments of a process for self-interference cancelation in accordance with various embodiments of the present disclosure. For example, the process depicted in FIGS. 7A-7B may be performed by the BS 102 or the UE 104 of FIGS. 1-3. For convenience, the process will be discussed from the point of view of an FDD BS. Various embodiments of the process depicted in FIGS. 7A-7B may be implemented using the FDD communication devices 400 and 500 of FIGS. 4A and 5A, respectively.

The process begins by generating, by a transmit path circuitry, a transmit signal to be input to a duplexer and transmitted through an antenna in a transmit frequency band (step 705). For example, in step 705, a DL TX signal is generated for transmission in an FDD TX band by an antenna of the FDD BS. The DL TX signal is provided to the duplexer in the transmit path circuitry, and a transmitter-side filter of the duplexer provides an amount of isolation between the DL TX band and the UL RX band, as discussed above.

Next, the process reduces power of the transmit signal in a receive frequency band, using analog transmitter-side RF SIC circuitry, before input to the antenna (step 710). The receive frequency band is an FDD UL band in which a receive signal is to be received by the FDD BS antenna. For example, in step 710, the analog transmitter-side RF SIC circuitry reduces the power of the DL TX signal in the UL RX band at an output of the transmitter-side filter of the duplexer based on the DL TX signal at an input to the transmitter-side filter.

In some embodiments, the analog transmitter-side RF SIC circuitry comprises a first multi-tap RF self-interference canceler, and each tap of the first multi-tap RF self-interference canceler comprises a fixed delay component, a tunable phase shifter, and optionally a tunable attenuator. In step 710, the DL TX signal at the input to the transmitter-side filter can be coupled into the first multi-tap RF self-interference canceler, and the output of the first multi-tap RF self-interference canceler can be coupled to the output of the transmitter-side filter to combine the signals before input to the antenna. By tuning the phase shifters and attenuators of the first multi-tap RF self-interference canceler, the shape and frequency of the signal output by the first multi-tap RF self-interference canceler can be designed to reduce the power of the DL TX signal in the UL RX band when combined with the DL TX signal at the output of the transmitter-side filter.

Next, the process receives, via the antenna, the receive signal in the receive frequency band (step 715). For example, in step 715, the UL RX signal is received in the FDD UL band by the FDD BS antenna. In some embodiments, the UL RX signal is received simultaneously with the transmission of the DL TX signal in step 705. This can cause TX leakage and TX noise floor from the DL TX signal to be induced in the UL RX signal, as discussed above. In order to reduce the effect of the TX leakage and TX noise floor, the UL RX signal is provided from the antenna through the duplexer before the process continues to step 720. A receiver-side filter of the duplexer provides an amount of isolation between the DL TX band and the UL RX band, as discussed above.

The process then reduces the power of the receive signal in the transmit frequency band, using analog receiver-side RF SIC circuitry, before input to receive path circuitry (step 720). For example, in step 720, the analog receiver-side RF SIC circuitry reduces the power of the UL RX signal in the DL TX band at an output of the receiver-side filter of the duplexer based on the UL RX signal at an input to the receiver-side filter. The reduction in power of the UL RX signal in the DL TX band can be designed such that the resulting signal does not cause non-linearity when processed by the receive path circuitry, such as in step 725. For example, the receive path circuitry can include an LNA, and the reduction in power at step 720 can prevent non-linearity from occurring when the resulting signal is amplified by the LNA.

In some embodiments, the analog receiver-side RF SIC circuitry comprises a second multi-tap RF self-interference canceler, and each tap of the second multi-tap RF self-interference canceler comprises a fixed delay component, a tunable phase shifter, and optionally a tunable attenuator. In step 720, the UL RX signal at the input to the receiver-side filter can be coupled into the second multi-tap RF self-interference canceler, and the output of the second multi-tap RF self-interference canceler can be coupled to the output of the receiver-side filter to combine the signals before input to the receive path circuitry. By tuning the phase shifters and attenuators of the second multi-tap RF self-interference canceler, the shape and frequency of the signal output by the second multi-tap RF self-interference canceler can be designed to reduce the power of the UL RX signal in the DL TX band when combined with the UL RX signal at the output of the receiver-side filter.

The process next converts, using a first ADC in the receive path circuitry, the receive signal from an analog receive signal to a digital receive signal (step 725). In this embodiment, the first ADC is an RFADC, and no downconversion of the analog receive signal is necessary before input to the first ADC. The digital receive signal is input to digital SIC cancelation circuitry for later use at step 735.

The process then converts, by a second ADC in coupled path circuitry, a small part of the transmit signal from an analog transmit signal to digital samples of the transmit signal (step 730). In this embodiment, the second ADC is an RFADC, and no downconversion of the analog receive signal is necessary before input to the second ADC.

Next, the digital sample of the transmit signal is processed by digital SIC circuitry to generate an SIC signal (step 735), and the digital SIC circuitry applies the SIC signal to the digital receive signal to cancel interference induced in the receive signal by the transmit signal (step 740). For example, in step 740, the SIC signal is subtracted from the digital UL RX signal, which cancels an amount of the TX leakage and TX noise floor interference from the UL RX signal in the UL RX band. The output of the process is the SIC residual, which can be made available for further RX processing in the FDD BS.

FIG. 7B illustrates further details of an embodiment of the digital SIC processing of step 735. In this embodiment, the digital sample of the transmit signal is equalized to the digital receive signal by the digital SIC circuitry (step 736). For example, step 736 includes determining time domain equalizer coefficients based on a first channel response of the receive path circuitry and a second channel response of the coupled path circuitry. Next, the digital SIC circuitry applies the time domain equalizer coefficients to the digital sample of the transmit signal to generate the SIC signal (step 737). It is understood that this is one embodiment of digital SIC processing, and other types of digital SIC processing could be used.

Although FIGS. 7A-7B illustrate one example of a process for self-interference cancelation, various changes may be made to FIGS. 7A-7B. For example, the digital SIC steps of the process could be omitted, and the parameters of the analog RF SIC components could be adjusted to account for the isolation requirements of the system.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A communication device comprising:
an antenna configured to receive a receive signal in a receive frequency band and transmit a transmit signal in a transmit frequency band;
a duplexer operably connected to the antenna;
transmit path circuitry configured to generate the transmit signal for input to the duplexer;
analog transmitter-side radio frequency (RF) self-interference cancelation circuitry configured to reduce power of the transmit signal in the receive frequency band before input to the antenna;
analog receiver-side RF self-interference cancelation circuitry configured to reduce power of the receive signal in the transmit frequency band before input to receive path circuitry;
the receive path circuitry configured to process the receive signal, the receive path circuitry including a first analog to digital converter (ADC) configured to convert the receive signal from an analog receive signal to a digital receive signal;

coupled path circuitry comprising a coupler and a second ADC, the coupler configured to couple the transmit signal to the second ADC, the second ADC configured to convert the transmit signal from an analog transmit signal to digital samples of the transmit signal; and digital self-interference cancelation circuitry configured to:
  process the digital sample of the transmit signal that is output by the coupled path circuitry to generate a self-interference cancelation signal; and
  apply the self-interference cancelation signal to the digital receive signal that is output by the first ADC to cancel interference induced in the receive signal by the transmit signal.

2. The communication device of claim 1, wherein:
the duplexer comprises a transmitter-side filter and a receiver-side filter,
the analog transmitter-side RF self-interference cancelation circuitry is connected between an input and an output of the transmitter-side filter to reduce the power of the transmit signal in the receive frequency band at the output of the transmitter-side filter based on the transmit signal at the input to the transmitter-side filter, and
the analog receiver-side RF self-interference cancelation circuitry is connected between an input and an output of the receiver-side filter to reduce the power of the receive signal in the transmit frequency band at the output of the receiver-side filter based on the receive signal at the input to the receiver-side filter.

3. The communication device of claim 2, wherein:
the analog transmitter-side RF self-interference cancelation circuitry comprises second and third couplers and a first multi-tap RF self-interference canceler, the second coupler configured to couple a portion of the transmit signal at the input of the transmitter-side filter to the first multi-tap RF self-interference canceler, each tap of the first multi-tap RF self-interference canceler comprising a fixed delay component and a tunable phase shifter, the third coupler configured to couple an output of the first multi-tap RF self-interference canceler to the output of the transmitter-side filter, and
the analog receiver-side RF self-interference cancelation circuitry comprises fourth and fifth couplers and a second multi-tap RF self-interference canceler, the fourth coupler configured to couple a portion of the receive signal at the input of the receiver-side filter to the second multi-tap RF self-interference canceler, each tap of the second multi-tap RF self-interference canceler comprising a fixed delay component and a tunable phase shifter, the fifth coupler configured to couple an output of the second multi-tap RF self-interference canceler to the output of the receiver-side filter.

4. The communication device of claim 3, wherein:
each tap of the first multi-tap RF self-interference canceler of the analog transmitter-side RF self-interference cancelation circuitry further comprises a tunable attenuator, and
each tap of the second multi-tap RF self-interference canceler of the analog receiver-side RF self-interference cancelation circuitry further comprises a tunable attenuator.

5. The communication device of claim 1, wherein the digital self-interference cancelation circuitry is configured to process the digital sample of the transmit signal by equalizing the digital sample of the transmit signal to the digital receive signal.

6. The communication device of claim 5, wherein the analog receiver-side RF self-interference cancelation circuitry is configured to reduce the power of the receive signal in the transmit frequency band such that the receive signal does not cause non-linearity in an output of the receive path circuitry.

7. The communication device of claim 6, wherein application of the self-interference cancelation signal to the digital receive signal cancels the interference induced in the receive signal to a noise floor.

8. A communication device comprising:
an antenna configured to receive a receive signal in a receive frequency band and transmit a transmit signal in a transmit frequency band;
a duplexer operably connected to the antenna and configured to reduce interference induced in the receive signal by the transmit signal, the duplexer comprising a receiver-side filter and a transmitter-side filter;
transmit path circuitry configured to generate the transmit signal for input to the duplexer;
analog transmitter-side radio frequency (RF) self-interference cancelation circuitry configured to reduce power of the transmit signal in the receive frequency band before input to the antenna;
receive path circuitry configured to receive the receive signal from the duplexer and to process the receive signal; and
analog receiver-side RF self-interference cancelation circuitry configured to reduce power of the receive signal in the transmit frequency band before input to the receive path circuitry.

9. The communication device of claim 8, wherein:
the analog transmitter-side RF self-interference cancelation circuitry is connected between an input and an output of the transmitter-side filter to reduce the power of the transmit signal in the receive frequency band at the output of the transmitter-side filter based on the transmit signal at the input to transmitter-side filter, and
the analog receiver-side RF self-interference cancelation circuitry is connected between an input and an output of the receiver-side filter to reduce the power of the receive signal in the transmit frequency band at the output of the receiver-side filter based on the receive signal at the input to the receiver-side filter.

10. The communication device of claim 9, wherein:
the analog transmitter-side RF self-interference cancelation circuitry comprises first and second couplers and a first multi-tap RF self-interference canceler, the first coupler configured to couple a portion of the transmit signal at the input of the transmitter-side filter to the first multi-tap RF self-interference canceler, each tap of the first multi-tap RF self-interference canceler comprising a fixed delay component and a tunable phase shifter, the second coupler configured to couple an output of the first multi-tap RF self-interference canceler to the output of the transmitter-side filter, and
the analog receiver-side RF self-interference cancelation circuitry comprises third and fourth couplers and a second multi-tap RF self-interference canceler, the third coupler configured to couple a portion of the receive signal at the input of the receiver-side filter to the second multi-tap RF self-interference canceler, each tap of the second multi-tap RF self-interference canceler comprising a fixed delay component and a tunable phase shifter, the fourth coupler configured to couple an output of the second multi-tap RF self-interference canceler to the output of the receiver-side filter.

11. The communication device of claim 10, wherein:
each tap of the first multi-tap RF self-interference canceler of the analog transmitter-side RF self-interference cancelation circuitry further comprises a tunable attenuator, and
each tap of the second multi-tap RF self-interference canceler of the analog receiver-side RF self-interference cancelation circuitry further comprises a tunable attenuator.

12. The communication device of claim 10, wherein the first and second multi-tap RF self-interference cancelers are two-tap RF self-interference cancelers.

13. The communication device of claim 8, wherein the analog receiver-side RF self-interference cancelation circuitry is configured to reduce the power of the receive signal in the transmit frequency band such that the receive signal does not cause non-linearity in an output of the receive path circuitry.

14. A method of self-interference cancelation in a communication device, comprising:
generating, by transmit path circuitry, a transmit signal to be input to a duplexer and transmitted through an antenna in a transmit frequency band;
receiving, via the antenna, a receive signal in a receive frequency band;
reducing power of the transmit signal in the receive frequency band, by analog transmitter-side radio frequency (RF) self-interference cancelation circuitry, before input to the antenna;
reducing power of the receive signal in the transmit frequency band, by analog receiver-side RF self-interference cancelation circuitry, before input to receive path circuitry;
converting, by a first analog to digital converter (ADC) in the receive path circuitry, the receive signal from an analog receive signal to a digital receive signal;
converting, by a second ADC in a coupled path circuitry, the transmit signal from an analog transmit signal to digital samples of the transmit signal;
processing, by digital self-interference cancelation circuitry, the digital sample of the transmit signal to generate a self-interference cancelation signal; and
applying, by the digital self-interference cancelation circuitry, the self-interference cancelation signal to the digital receive signal to cancel interference induced in the receive signal by the transmit signal.

15. The method of claim 14, wherein:
the duplexer comprises a transmitter-side filter and a receiver-side filter,
reducing the power of the transmit signal in the receive frequency band comprises reducing, by the analog transmitter-side RF self-interference cancelation circuitry, the power of the transmit signal in the receive frequency band at an output of the transmitter-side filter based on the transmit signal at an input to the transmitter-side filter, and
reducing the power of the receive signal in the transmit frequency band comprises reducing, by the analog receiver-side RF self-interference cancelation circuitry, the power of the receive signal in the transmit frequency band at an output of the receiver-side filter based on the receive signal at an input to the receiver-side filter.

16. The method of claim 15, further comprising:
coupling a portion of the transmit signal at the input of the transmitter-side filter to a first multi-tap RF self-interference canceler of the analog transmitter-side RF self-interference cancelation circuitry, each tap of the first multi-tap RF self-interference canceler comprising a fixed delay component and a tunable phase shifter,
coupling an output of the first multi-tap RF self-interference canceler to the output of the transmitter-side filter,
coupling a portion of the receive signal at the input of the receiver-side filter to a second multi-tap RF self-interference canceler of the analog receiver-side RF self-interference cancelation circuitry, each tap of the second multi-tap RF self-interference canceler comprising a fixed delay component and a tunable phase shifter, and
coupling an output of the second multi-tap RF self-interference canceler to the output of the receiver-side filter.

17. The method of claim 16, wherein:
each tap of the first multi-tap RF self-interference canceler of the analog transmitter-side RF self-interference cancelation circuitry further comprises a tunable attenuator, and
each tap of the second multi-tap RF self-interference canceler of the analog receiver-side RF self-interference cancelation circuitry further comprises a tunable attenuator.

18. The method of claim 14, wherein:
processing, by the digital self-interference cancelation circuitry, the digital sample of the transmit signal comprises equalizing the digital sample of the transmit signal to the digital receive signal.

19. The method of claim 18, further comprising:
reducing the power of the receive signal in the transmit frequency band, by the analog receiver-side RF self-interference cancelation circuitry, such that the receive signal does not cause non-linearity in an output of the receive path circuitry.

20. The method of claim 19, further comprising:
applying, by the digital self-interference cancelation circuitry, the self-interference cancelation signal to the digital receive signal to cancel the interference induced in the receive signal to a noise floor.

* * * * *